United States Patent

Gevorgian

[11] Patent Number: 5,262,243
[45] Date of Patent: Nov. 16, 1993

[54] STONE MEMBERS HAVING A DECORATIVE METALLIC SURFACE

[76] Inventor: Abraham Gevorgian, 240 E. Beverly Terr., Montebello, Calif. 90640

[21] Appl. No.: 759,525

[22] Filed: Sep. 13, 1991

[51] Int. Cl.$^5$ .................. B32B 15/04; B44C 1/14
[52] U.S. Cl. ............................ 428/457; 428/15
[58] Field of Search .............. 428/457, 15, 35.3; 156/153; 52/103, 104; 47/72; 229/87.01

[56] References Cited

U.S. PATENT DOCUMENTS

| | | | |
|---|---|---|---|
| 1,789,153 | 1/1931 | Osborne | 428/913.3 X |
| 1,927,546 | 9/1933 | Gilbert | 156/62 |
| 2,108,444 | 2/1938 | Reilly | 428/913.3 X |
| 3,228,818 | 1/1966 | Seby | 156/153 X |
| 3,251,319 | 5/1966 | Kaupert et al. | 426/414 X |
| 3,488,201 | 1/1970 | Pizarro | 426/126 |
| 3,567,538 | 3/1971 | Lind | 156/154 |
| 3,775,916 | 12/1973 | Bair | 52/315 X |
| 3,877,958 | 4/1975 | Ishii | 428/142 X |
| 4,097,636 | 6/1978 | Hawrylo et al. | 428/336 X |
| 4,385,968 | 5/1983 | Gaston | 205/176 |
| 4,546,875 | 10/1985 | Zweber | 229/87.2 X |
| 4,664,955 | 5/1987 | Clem | 428/15 |
| 4,725,451 | 2/1988 | Cripe | 428/15 X |
| 4,765,464 | 8/1988 | Ristuedt | 229/87.2 X |
| 4,923,665 | 5/1990 | Andersen et al. | 428/225 X |
| 4,935,268 | 6/1990 | Poll | 428/15 |
| 5,004,512 | 4/1991 | Fodera | 156/153 |

Primary Examiner—Henry F. Epstein
Attorney, Agent, or Firm—Gene W. Arant

[57] ABSTRACT

A member having a protruding irregular surface area, a thin and malleable metallic foil member covering a substantial surface portion of the member and secured thereto by an adhesive material, and means securing the otherwise protruding edges of the foil against being pulled loose.

8 Claims, 2 Drawing Sheets

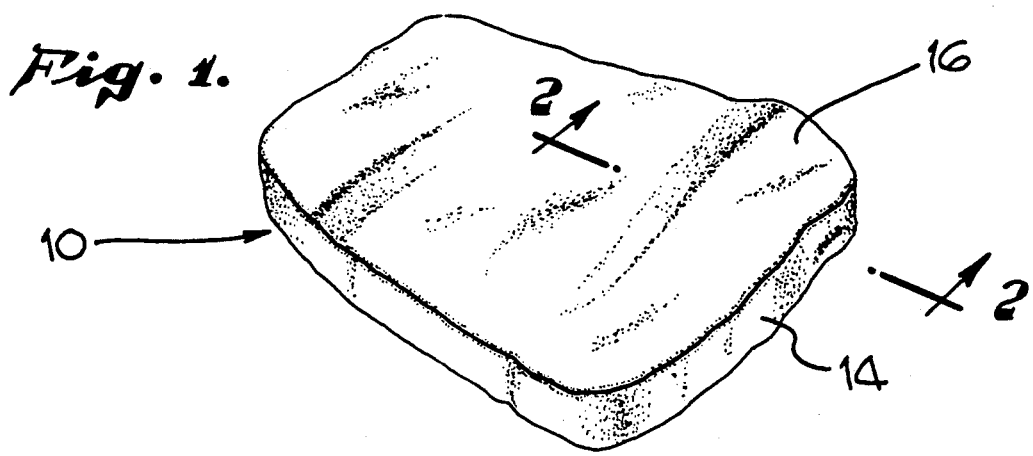
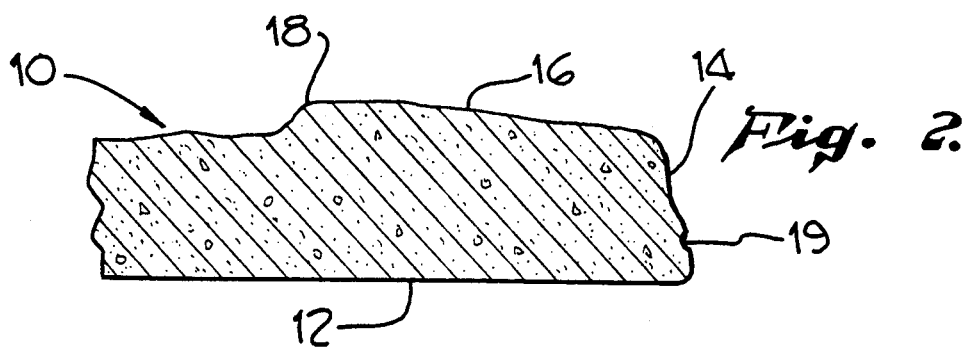
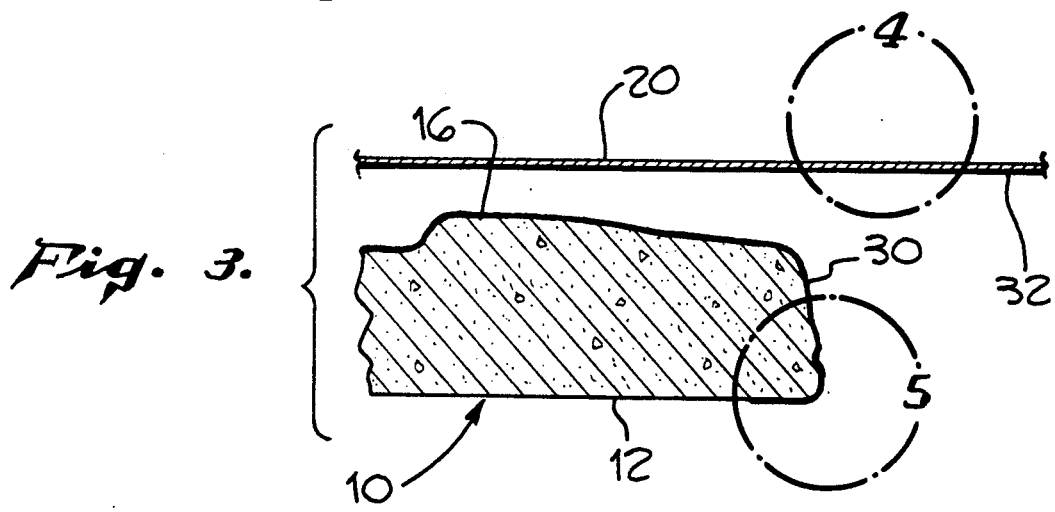
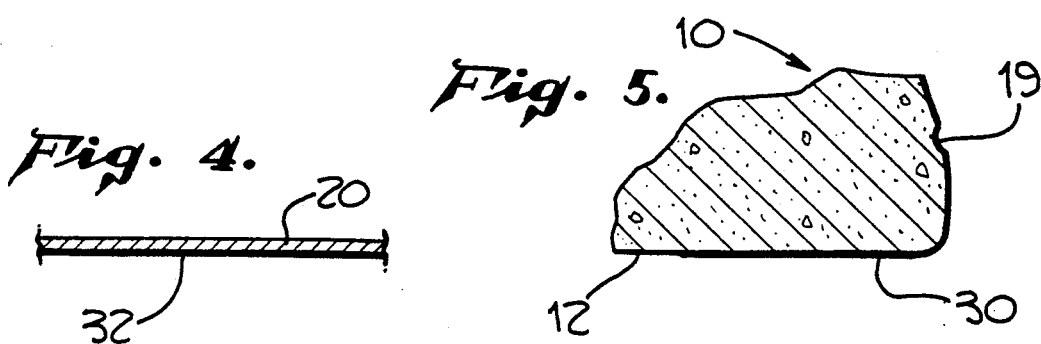

STONE MEMBERS HAVING A DECORATIVE METALLIC SURFACE

FIELD OF THE INVENTION

The invention relates to stone-like members having an artistic appearance, which may be used either for structural and artistic purposes, or for artistic purposes alone.

PRIOR ART

Ishii patent No. 3,877,958 issued in 1975 shows the idea of using powdered stone to make a roughened surface 7, 9 on a flat panel 1; and then using lacquer 10 mixed with reflective metal powder to coat the surface.

Cripe patent No. 4,725,451 issued in 1988 shows decorating a natural rock surface with a particular varnish to make the rock look more aged than it is.

Andersen et al patent No. 4,923,665 issued in 1990 shows making a structural member by first forming a metal shell, and then filling it with concrete or the like which can be formed at temperatures far below the melting point of the metal. It also refers, without explanation, to "applying a layer of metal (12) to one or more surface parts" (of the concrete).

BACKGROUND OF THE INVENTION

The invention has been developed based upon my idea that it will be desirable to create stone-like members having a metallic surface appearance, and which may be used either for structural and artistic purposes, or for artistic purposes alone.

I have investigated the following ways of creating stone-like members having a metallic surface appearance.

1. The stone may be sprayed with metallic paint, then electrodes may be connected to the metallic paint, and the stone may then be placed within an acid plating bath in order to electroplate a coating of metal onto its entire surface.

2. A metal net may be placed over the stone, then electrodes may be connected to the net, and the stone then placed within an acid plating bath in order to electroplate a coating of metal onto its entire surface.

3. The surface of the stone may be covered with a metallic paste, such as a commercially available copper paste.

4. Metallic granules may be placed in the upper portion of a blow torch, and the flame of the bow torch then used to melt the granules while at the same time projecting the molten metal onto the surface of the stone.

5. The stone may be covered with a translucent paint having a metallic appearance.

6. Some combination of the foregoing methods may be used.

SUMMARY OF THE INVENTION

The invention provides a method of preparing a stone-like member having a decorative metallic surface, by cleaning the surface of a stone and then applying a metallic foil in tightly glued relationship to the cleaned surface.

The invention also provides a stone-like member having a protruding irregular surface area, a thin and malleable metallic foil member covering a substantial surface portion of the stone-like member and secured thereto by an adhesive material, and means securing the otherwise protruding edges of the foil against being pulled loose.

In many instances it is advisable to slightly modify the surface contour of the stone to alleviate sharp corners and deep crevices, before applying the adhesive and the metal foil. This is done by grinding or sanding off the sharp corners and filling the crevices with a filler material. Thereafter, adhesive material is applied to both the metal foil and the cleaned surface of the stone, and then the metal foil is secured to the stone.

As a practical matter the stone usually has a back side or under side which is substantially flat, and upon which the stone will then be supported. I prefer to cover all of the stone except its under side with the foil, to also provide turned-over edges of the foil which extend over the under side of the stone, and then to apply a backing material such as mortar to the under side of the stone so that it covers the turned-over edges of the foil, secures them in place, and at the same time protects any person handling the stone from accidental injury by sharp edges of the foil.

Thus the object of my invention is to provide metal covered stones, bricks, and artificial stones, which are decorative and ornamental in nature and which are very simple to produce.

BRIEF DESCRIPTION OF THE DRAWINGS

FIG. 1 is a perspective view of a stone which has been smoothed and cleaned in preparation for receiving a metallic cover in accordance with the invention;

FIG. 2 is a fragmentary cross-sectional view of the stone of FIG. 1 taken on line 2—2 thereof;

FIG. 3 is a fragmentary cross-sectional view of the stone after some of its surface area has been covered with a liquid adhesive, and also showing a sheet of metallic foil having a surface covered with a liquid adhesive;

FIG. 4 is an enlarged fragmentary view of the foil, taken on line 4—4 of FIG. 3;

FIG. 5 is an enlarged fragmentary view of the stone, taken on line 5—5 of FIG. 3;

DETAILED DESCRIPTION OF THE INVENTION

Figure 6:
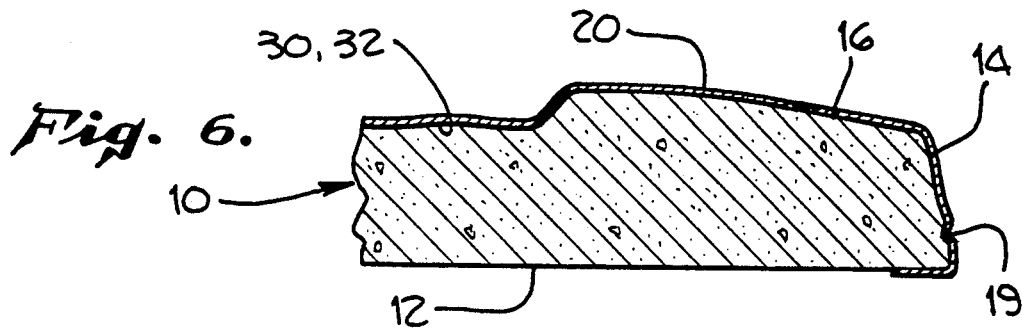
FIG. 6 is a fragmentary cross-sectional view of the stone as in FIG. 2, but showing the foil wrapped over and partly around it.

According to the present invention the metal sheet material should be a soft and malleable metal, such as copper or aluminum. Preferably a foil material is utilized having a thickness of about 3 to 5 mils; but a greater or lesser thickness may be used if the metal has both the requisite resistance to tearing and the requisite degree of malleability.

The exposed surface portion of the stone-like member is cleaned at least to the extent of what could be viewed from a single view point. Cleaning of the stone should preferably be done by air pressure rather than water, although a jostling or centrifugal motion may also suffice. Pressurized air will remove some small particles from the surface that are unstable. Water, on the other hand, will penetrate the stone, and may later cause the foil or veneer to peel off.

To give an object or stone a metallic look or veneer, the method of the present invention is as follows:

1. The stone is cleaned on its upper and lateral surfaces that will be exposed, preferably by air pressure.
2. Crevices are filled with a mortar-like material.
3. Sharp corners are rounded off as needed, by grinding or sanding.
4. The under surface of the metal foil that will contact the stone is cleaned.
5. A liquid contact cement or other adhesive is selected for securing the metal foil upon the stone. The metal to masonry type contact cement does not appear to be satisfactory for this purpose. Instead it is preferred to use an ordinary type of liquid contact cement.
6. The top and sides edges of the stone are coated with the liquid adhesive.
7. One surface of the foil is coated with the liquid adhesive.
8. The adhesive is allowed to set for a few minutes, and the metal foil is then laid or placed over the cleaned adhesive surface of the stone so that the two adhesively covered surfaces are in contact.
9. The metal foil is then carefully pushed against the stone so as to conform to the surface of the stone, and also into the cracks and crevices of the stone. This may be accomplished by using a small sharp mallet. As an alternate process, small plastic balls can be placed on top of the veneer or foil and pressed down using a forming press, to shape the foil to the shape of the stone. At this time the metal foil assumes the shape of the stone.
10. Besides pushing the foil down to conform to cracks and crevices, bumps and protrusions, and hence the odd shape of the surface of the stone itself, the edges of the foil are also extended underneath the under surface of the stone.
11. The excess portion of the extending edges of the foil is cut at the base or under side of the stone.
12. A layer of a masonry product, such as THIN-SET mortar or QUIK-FIX, or the like, is then applied to the under side of the stone, making sure that it covers and secures all protruding edges of the foil. This covers the base on its bottom side and also gives the product a finished look.
13. Then the metal veneered stone or object is polished. If it is to be used out of doors, it is also covered with a weather-proofing material.

The invention will now be described in detail with reference to the accompanying drawings.

A stone 10 shown in FIGS. 1 and 2 has a rather flat bottom or under surface 12, lateral side surfaces 14, and a top surface 16. On its upper surface 16 there is a discontinuity 18 which, previously, was rather sharp. However, when the stone was cleaned, that sharp edge was ground or sanded off so that it became fairly smooth, as shown. At one point on the lateral or side surface 14 there is a small crevice 19, as shown in FIG. 2.

In some instances it might be desirable to fill the crevice 19 with a mortar-like fill material. As a matter of fact, the stone 10 originally had other cracks and crevices, not specifically shown in the drawings, which were filled.

FIGS. 3, 4, and 5 show a sheet 20 of copper foil which will be used to cover the stone 10. A layer 30 of liquid contact cement is placed over the upper surface 16 of the stone, over its lateral or side surfaces 14, and partially over its under or bottom surface 12. The adhesive layer covers at least as much of the exposed surface portion of the stone-like member as could be viewed from a single view point. A layer 32 of liquid contact cement is placed over one surface of the foil, being its bottom surface in the aspect shown in the drawings.

As previously explained, the adhesive is allowed to set for a few minutes, and then the metal foil is placed over the cleaned and adhesively covered surface of the stone so that the two adhesively covered surfaces are in contact. FIG. 6 shows the foil 20 wrapped over and partly around the stone 10, so that it covers the surface areas of the stone to which the liquid adhesive was previously applied.

At this time it is necessary to carefully push the foil against the stone so as to conform to the surface of the stone, and also into the cracks and crevices of the stone. This may be accomplished by using a small sharp mallet. According to the present invention the metal sheet member 20 is made of a soft and malleable metal, such as copper or aluminum. Preferably the foil has a thickness of about 3 to 5 mils, but a greater or lesser thickness may be used if the metal has both the requisite resistance to tearing and the requisite degree of malleability. Because of its malleability and resistance to tearing, the metal can indeed be appropriately formed against the stone with a small sharp mallet.

Figure 7:
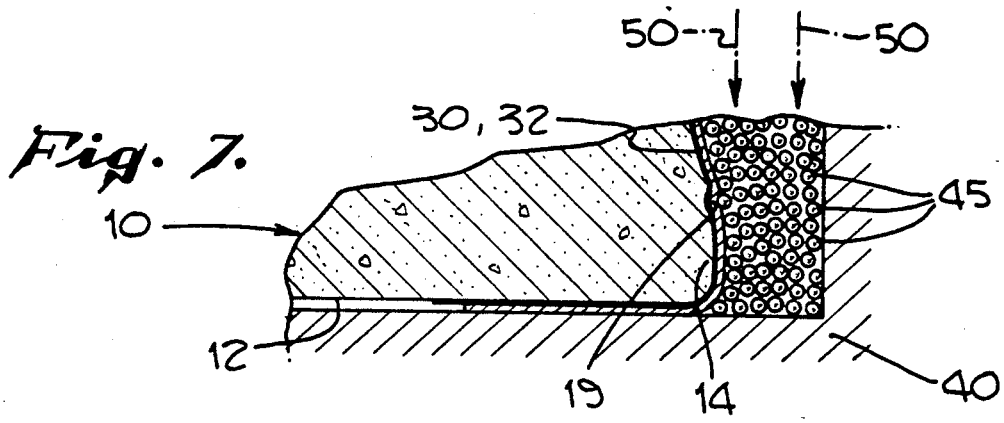
FIG. 7 is an enlarged fragmentary vertical cross-sectional view of the stone and the foil, enclosed inside a forming press, the foil being covered with small plastic balls to compress the foil and hence to deform its surface to conform to the surface of the stone.

FIG. 7 illustrates an alternate forming process in accordance with the invention. The stone 10 covered by foil 20 is placed inside a press 40. Spaces surrounding the stone are filled with small plastic balls 45. Then pressure is applied to the plastic balls as indicated by arrows 50. The other surface of the metallic foil member, not covered by the adhesive material, is pressed by the plastic balls. As shown in the enlarged view of FIG. 7, not only is the foil made to conform generally to the shape of the stone, but in particular, it fills the small crevice 19 in the side wall 14 of the stone and also conforms thereto.

Figure 8:
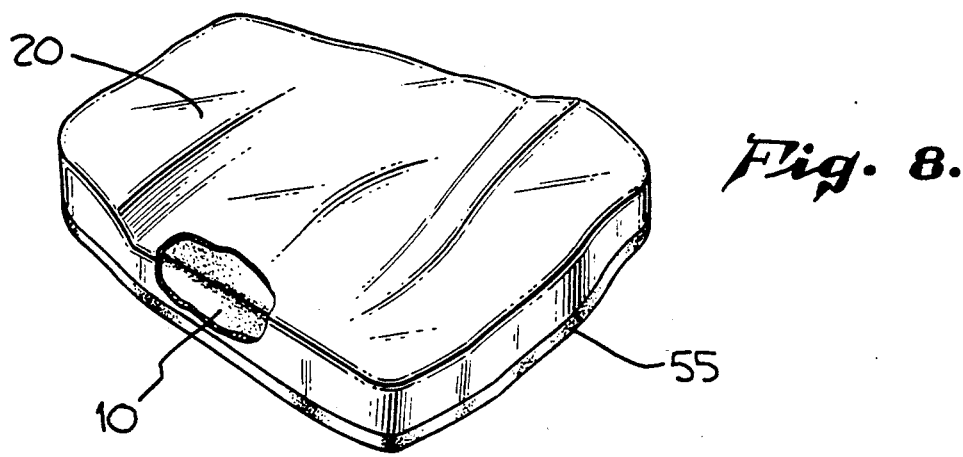
FIG. 8 is a perspective view of the completed metal-covered stone with a portion of the foil cut away.
Figure 9:
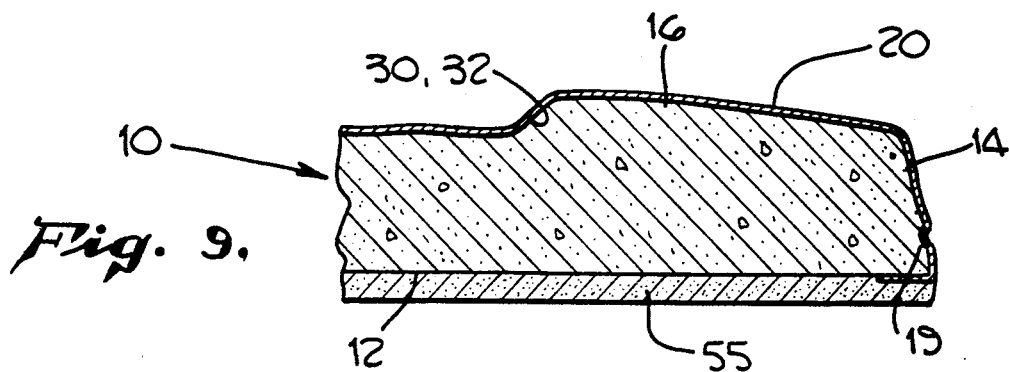
FIG. 9 is an enlarged fragmentary cross-sectional view of the completed metal-covered stone.

FIGS. 8 and 9 show the completed stone, to which a layer of mortar 55 has been added. The mortar covers the bottom surface 12 of the stone, and also captures and confines the otherwise free edges of the foil. This gives the product a look of completeness, precludes the possibility of the foil coming loose from the stone, and also protects persons who might handle the stone from possible injury by free edges of the foil.

As a further refinement, not specifically illustrated in the drawings, the stone may be given a precious metallic look, such as gold, by means of a brush plating process. Such process is shown, for example, in U.S. Pat. No. 4,385,968. If a two tone color is desired, the finished product may be partially plated, or plated with two different metals.

The invention has been described in considerable detail in order to comply with the patent laws by providing a full public disclosure of its presently preferred form. However, such detailed description is not intended in any way to limit the broad principles or features of the invention, which are to be measured only in accordance with the appended claims.

What I claim is:

1. An ornamental object having a decorative metallic outer surface, said object comprising a rigid base member having an irregular outer surface area that includes a rear face, a front face, and side faces that extend around the periphery of the front face, a thin and malleable metallic foil member closely covering substantially all of said front and side faces, some edge portions of said foil member protruding beyond said side faces and overlying adjacent portions of said rear face, and adhesive material permanently securing said foil member to said faces.

2. The ornamental object of claim 1 which is also adapted for structural use, wherein said rear face is flat, wherein said adhesive material secures said protruding edge portions of said foil member to said adjacent portions of said rear face, and which further includes a layer of mortar covering the otherwise exposed portion of said rear face as well as said protruding edge portions of said foil member.

3. An ornamental object as claimed in claim 2 wherein said rigid base member is a stone.

4. An ornamental object as claimed in claim 1 wherein said rigid base member is a stone.

5. An ornamental object having a decorative metallic outer surface, said object comprising;

a rigid base member having an irregular outer surface area that includes a front and side faces, a thin and malleable foil member closely covering at least a substantial portion of said front and side faces, and adhesive material permanently securing said foil member to said faces, said base member also having a rear face which meets said side faces, and at least some edge portions of said foil member protruding beyond said side faces and overlying adjacent portions of said rear face, said object also including securing means that permanently secures said protruding edge portions to said adjacent portions of said rear face to aid in securing said foil member closely covering said base member.

6. The ornamental object of claim 5 which is also adapted for structural use, wherein said rear face is flat, wherein said adhesive material secures said protruding edge portions of said foil member to said adjacent portions of said rear face, and wherein said securing means includes a layer of mortar covering the otherwise exposed portions of said rear face as well as said protruding edge portions of said foil member.

7. An ornamental object as claimed in claim 6 wherein said rigid base member is a stone.

8. An ornamental object as claimed in claim 5 wherein said rigid base member is a stone.

* * * * *